(12) United States Patent
Morovic et al.

(10) Patent No.: US 8,922,580 B2
(45) Date of Patent: Dec. 30, 2014

(54) METHOD AND SYSTEM TO MODIFY A COLOR LOOKUP TABLE

(75) Inventors: Peter Morovic, Barcelona (ES); Jan Morovic, Colchester (GB); Jordi Arnabat Benedicto, Tarragona (ES); Manuel Angel Albarran Moyo, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 168 days.

(21) Appl. No.: 13/279,228

(22) Filed: Oct. 21, 2011

(65) Prior Publication Data

US 2013/0100157 A1 Apr. 25, 2013

(51) Int. Cl.
G09G 5/02 (2006.01)
H04N 1/60 (2006.01)
G09G 5/06 (2006.01)

(52) U.S. Cl.
CPC ............... *H04N 1/6011* (2013.01); *G09G 5/06* (2013.01); *H04N 1/603* (2013.01); *G09G 2340/06* (2013.01)
USPC .......................................................... 345/601

(58) Field of Classification Search
None
See application file for complete search history.

(56) References Cited

U.S. PATENT DOCUMENTS

| | | | |
|---|---|---|---|
| 5,581,376 A * | 12/1996 | Harrington | 358/518 |
| 5,583,665 A | 12/1996 | Gregory, Jr. et al. | |
| 6,262,812 B1 * | 7/2001 | Chan et al. | 358/1.9 |
| 6,269,184 B1 | 7/2001 | Spaulding et al. | |
| 6,693,643 B1 | 2/2004 | Trivedi et al. | |
| 6,919,975 B1 * | 7/2005 | Haikin et al. | 358/518 |
| 6,996,271 B2 * | 2/2006 | Ono et al. | 382/167 |
| 7,200,263 B2 * | 4/2007 | Curry et al. | 382/154 |
| 7,456,997 B2 | 11/2008 | Pethania et al. | |
| 7,586,644 B2 * | 9/2009 | Walton et al. | 358/1.9 |
| 7,652,676 B2 | 1/2010 | Hayward | |
| 7,706,629 B2 | 4/2010 | Rosasco et al. | |
| 7,742,058 B2 * | 6/2010 | Mahy et al. | 345/590 |
| 2002/0026449 A1 * | 2/2002 | Azencott | 707/104.1 |
| 2003/0095596 A1 | 5/2003 | Shimizu | |
| 2004/0071362 A1 * | 4/2004 | Curry et al. | 382/274 |
| 2004/0239966 A1 * | 12/2004 | Larson | 358/1.9 |
| 2004/0263879 A1 * | 12/2004 | Ito et al. | 358/1.9 |
| 2006/0001892 A1 * | 1/2006 | Bai | 358/1.9 |
| 2007/0188779 A1 * | 8/2007 | Nagao et al. | 358/1.9 |
| 2007/0223016 A1 * | 9/2007 | Ichitani | 358/1.9 |
| 2010/0220111 A1 | 9/2010 | Stauder et al. | |
| 2010/0253955 A1 * | 10/2010 | Murata | 358/1.9 |

OTHER PUBLICATIONS

U.S. Appl. No. 12/876,939, filed Sep. 7, 2010, Morovic et al.

(Continued)

*Primary Examiner* — James A Thompson
*Assistant Examiner* — Xilin Guo (57) ABSTRACT

Modifying a color lookup table includes receiving a first image, a first color lookup table (CLUT) indexed in a first image color space, and a second CLUT indexed in a colorimetric space. Tracer pixels from the second CLUT are generated and retained, each tracer pixel including color coordinates of a corresponding unique node in the first CLUT. Tracer pixels are inserted into the first image, and tracer pixels are tracked. Color adjustments are made using image editing software to generate an adjusted combined image having adjusted tracer pixels. The adjusted tracer pixels are extracted. The second CLUT is converted to a third CLUT having a size $N_1 \times N_2 \times N_3 \times N_4$ by replacing each of the output-device color coordinates of the second CLUT nodes by modified device color coordinates computed from the adjusted color coordinates of the adjusted tracer pixels.

21 Claims, 5 Drawing Sheets

(56) References Cited

OTHER PUBLICATIONS

U.S. Appl. No. 12/876,973, filed Sep. 7, 2010, Morovic et al.
Balasubramanian, R., "Reducing the Cost of Lookup Table Based Color Transformations," IS&T & SID's 7th Color Imaging Conf: Color Science, Systems & Applications, 1999 (5 pgs).
PLA1STED, P.B. et al., "Construction Features of Color Output Device Profiles," IS&T & SID's 5th Color Imaging Conf, 1997 (6 pgs).
Lacie, "Color Management White Paper 4, The Basics on ICC Color Management Systems," date unknown (3 pgs).
Revie, C.W., FujiFilm, "ICC Color Management for Print Production," TAGA Annual Technical Conf 2002 (62 pgs).
International Color Consortium, Specification ICC.1:2004-10, Image Technology Colour Management-Architecture, Profile Format, & Date Structure, May 2006 (112 pgs).
International Color Consortiu "ICC Colour Management," 2003 (57 pgs).

\* cited by examiner

METHOD AND SYSTEM TO MODIFY A COLOR LOOKUP TABLE

BACKGROUND

The present disclosure relates generally to the modification of color lookup tables for rendering color images on devices.

A color image may be rendered on a device such as a display or a printer. Differences in hardware and software of devices, differences in viewing environment, and differences in human observers of a particular image may cause the image to appear differently when rendered on different devices. For example, hair color in a portrait may appear "correct" when observed on a computer display, but may not be "correct" when printed and observed in fluorescent lighting. A color lookup table (CLUT) is used to translate color between a device and a standard color space. By making changes to a CLUT, the preferences of an observer may be consistently applied to images rendered on a particular device.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the present disclosure provide a method of modifying a color lookup table (CLUT), such as an International Color Consortium (ICC) profile CLUT or CLUTs encoded in proprietary formats. Examples of CLUTs encoded in proprietary formats include those used by some Raster Image Processor (RIP) software and by imaging device firmware found in printers, digital cameras, displays and projectors. In examples of the disclosed method, tracer pixels may be taken from particular locations in the CLUT, inserted into an unadjusted image, adjusted as part of the image, extracted from the image and reinserted into the CLUT. The unadjusted image may be a digital image generated, for example, by a digital camera. A user of a specific display device may then generate an adjusted image by altering the colors of the unadjusted image, for example, by changing the color saturation levels of certain colors to suit the user's preferences.

The color adjustments made to the combined image may include, for example, changes to the hue or saturation level, contrast, exposure or tone curves and others. Color adjustments applied to the adjusted image may be local color adjustments, for example, changing the saturation of the blues. In a context of color space, color adjustment may also be a global color adjustment, for example, changing the overall tone curve or contrast across all colors. However, in context of an image, the term "global color adjustments", means that the color modifications are applied to the image as a whole, regardless of the location or region that a particular color is located within the image. Further, color adjustments may be spatial color adjustments. A spatial adjustment is a color modification that is applied to only a portion of an image rather than to the image as a whole. For example, a spatial adjustment may include red-eye reduction, air-brushing, or any other color adjustment that is applied to a subset of pixels of the image. It is to be understood that, in examples of the method disclosed herein, the spatial adjustments may be statistically applied to the image as a whole when performed using a CLUT. For example, if a seaside picture has the blue of the ocean adjusted by boosting saturation while the blue sky remains unadjusted, the result might be an overall but milder boost of saturation of all blues.

In examples of the disclosed method, the adjusted tracer pixels may be used to modify the color lookup table in accordance with the user's color adjustments. The modified color lookup table may subsequently be used to provide consistent and repeatable color reproduction that exhibits the user's color preferences.

Examples of the disclosed method may, in some instances, be used with adjustments that are made to images with a relatively small color gamut. The adjustments may be captured and applied across the entire color gamut on any image without requiring any additional intervention by a user. In an example of the disclosed method, boosting the saturation on a sample portrait image would enable boosting saturation across the entire color space and not only the color palette of the portrait dominated by skin tones.

Figure 1:
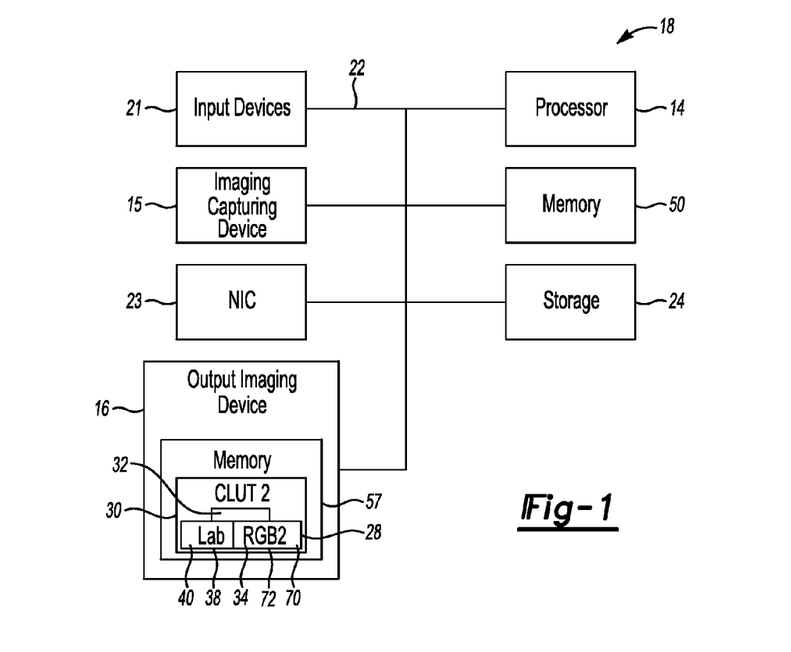
FIG. 1 is a block diagram depicting an example of a computing device that may be used to modify a CLUT as disclosed herein.

Referring now to FIG. 1, a block diagram of a computing device is depicted that may be used to generate a modified color lookup table in examples of the present disclosure. The computing device is generally referred to by reference number 18. It is to be understood that the functional blocks and devices shown in FIG. 1 may comprise hardware elements including circuitry, software elements including computer code stored on a non-transitory, computer-readable medium, or a combination of both hardware and software elements. Further, the configuration is not limited to that shown in FIG. 1, as any number of functional blocks and devices may be used in examples of the present disclosure. It is to be further understood that specific functional blocks may be defined based on, e.g., design considerations for a particular electronic device.

As illustrated in FIG. 1, the computing device 18 may include a digital processor 14 connected through a bus 22 to one or more types of non-transitory, computer readable media, such as a memory 50 that may be used during the execution of various operating programs, including operating programs used in examples of the present disclosure. The memory 50 may include read-only memory (ROM), random access memory (RAM), and the like. The computing device 18 may also include other non-transitory, computer readable media, such as a storage system 24 for the long-term storage of operating programs and data, including the operating programs and data used in examples of the present disclosure. The storage system 24 may include, for example, hard disks, CDs, DVDs, flash memory, and the like.

The computing device 18 may further include one or more input devices 21, such as a mouse, touch screen, and keyboard, among others. The computing device 18 may also include a network interface controller (NIC) 23, for connecting the computing device 18 to a network through a local area network (LAN), a wide-area network (WAN), or another network configuration. In an example, the computing device 18 is a general-purpose computing device, for example, a desktop computer, laptop computer, business server, and the like.

The computing device 18 may still further include, or be operatively connected to, an image capturing device 15, for example, an optical scanner, digital camera, and the like. It is to be understood that the image capturing device 15 may further include a device which stores a computer generated image. The image capturing device 15 may be used to capture images which may be processed according to the techniques described herein. Captured images may be stored to the memory 50 or the storage system 24 in a device independent color space or format. As used herein, the term "colorimetric" modifying the term "color space" means that the color space is device independent. The colors depicted depend on an output-device color space 28 of an output imaging device 16 on which the image is viewed. The International Commission on Illumination (usually abbreviated CIE for its French name, Commission internationale de l'éclairage) is an international authority on light, illumination, color, and color spaces. In the context of ICC color management, the device independent color space is referred to as the profile connection space (PCS) and may be either CIE L*a*b* or CIE XYZ. In other examples, any other suitable colorimetric color space may be used.

The computing device 18 includes the output imaging device 16. As used herein, the term "output imaging device" refers to any device that can display or create a visual image for display, for example, a computer monitor, an LCD screen, a printer or the like. The output imaging device 16 may include or be associated with a second CLUT 30 configured to map colorimetric colors of stored images to an output-device color space 28 specific to the output imaging device 16. For example, the output-device color space 28 may be a red-green-blue (RGB) color space or a cyan-magenta-yellow-black (CMYK) color space, among others. In FIG. 1, the output-device color space 28 is depicted as RGB2. The second CLUT 30 may be specific to the corresponding output imaging device 16 and may be included in an ICC color profile stored, for example, in an output-device memory 57 included in the output imaging device 16 or included in the storage device 24.

The second CLUT 30 may be a conversion table that defines the mapping between colorimetric color coordinates 38 in colorimetric space 40 and device color coordinates 72 in device color space 70. The color values of both the colorimetric space 40 and device color space 70 may be represented as a set of color coordinates that represent a point within the multidimensional color spaces. For a CLUT that maps between the colorimetric color space 40 and the RGB color space, the CLUT may be three dimensional for both color spaces. For another CLUT that maps between the colorimetric color space 40 and a CMYK color space (not shown), the color lookup table will be three dimensional in the colorimetric color space 40 and four dimensional in the CMYK color space. For the sake of clarity, the disclosed method may be described in reference to three dimensional color spaces. However, it will be appreciated that other multi-dimensional color spaces are within the scope of the present disclosure.

Each color coordinate has several corresponding color attributes, such as hue, saturation, brightness, and the like. The second CLUT 30 may be indexed by sets of colorimetric color coordinates 38, each index pointing to a corresponding set of output-device color coordinates 34. To display an image on the output imaging device 16, each pixel of the image may be converted from the colorimetric space 40 to the output-device color space 28 by inputting the colorimetric color coordinates 38 of the pixel, and obtaining the corresponding output-device color coordinates 34 as an output. The second CLUT 30 may include a plurality of nodes, referred to herein as "second CLUT nodes 32," which represent a sampling of both the colorimetric space 40 and output-device color space 28. The division number of the second CLUT may be 9×9×9, 17×17×17, 33×33×33, or generally N×N×N.

Each second CLUT node 32 defines a mapping from a specific color in the colorimetric space 40 to a specific color in the output-device color space 28. For example, if an input colorimetric color value matches the colorimetric color value of one of the second CLUT nodes, the output will be the corresponding output-device color coordinates 34 specified by the second CLUT node 32. It is to be noted, however, that if the input colorimetric color value lies between second CLUT nodes 32, the second CLUT nodes 32 nearest to the input colorimetric color value are identified, and an interpolation process may be required to obtain the output-device color coordinates 34. For 3D color spaces, the interpolation process may be trilinear or tetrahedral depending on a choice of speed (trilinear) or smoothness and other benefits (tetrahedral). Both of these interpolation methods have higher dimensional equivalents: n-linear and simplex interpolation. Such interpolation for a large number of pixels may present a large computation load to the computing device 18.

Figure 2:
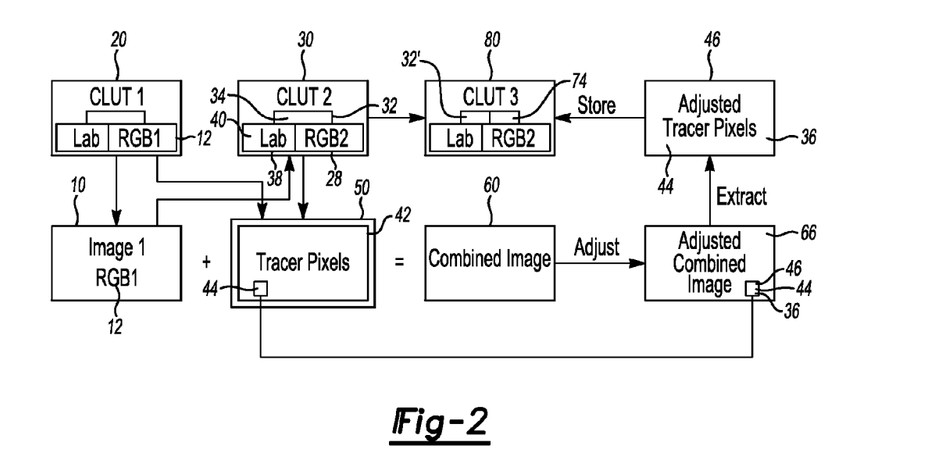
FIG. 2 is a block diagram depicting an example of a process to modify a CLUT executed by a computer system as disclosed herein.

FIG. 2 is a block diagram depicting an example of a process used to modify a CLUT as disclosed herein. A first image 10 is defined in a first image color space 12. The first image color space 12 is depicted as "RGB1." The first image 10 may be any type of digital image such as a photograph generated by the image capturing device 15 (FIG. 1). The first image 10 may also be an image obtained through the network, for example, from the Internet. The first image 10 may also be a test image supplied, for example, by a manufacturer of the output imaging device 16 to enable the discovery of a user's color preferences.

A first CLUT 20 is indexed in the first image color space 12, and a second CLUT 30 is indexed in a device-independent colorimetric space 40. The second CLUT 30 includes second CLUT nodes 32 and output-device color coordinates 34 for an output imaging device 16 at the second CLUT nodes 32. Tracer pixels 42 are generated from the second CLUT 30 and retained in a memory device 50. Each tracer pixel 42 includes color coordinates of a corresponding unique node in the first CLUT 20. The tracer pixels 42 are inserted into the first image 10 to form a combined image 60 in a combined image file. Spatial locations 44 of the tracer pixels 42 in the combined image 60 are tracked and retained in the memory device 50. Color adjustments are made to the combined image 60 using image editing computer readable instructions to generate an adjusted combined image 66 having adjusted tracer pixels 46 including adjusted color coordinates 36 in an adjusted combined image file.

It is to be understood that the adjusted combined image 66 may be obtained by applying color modifications to the combined image. For example, the color modifications may be made by a user of the computing device 18 to obtain an image that better suits the user's preferences for color reproduction on the output imaging device 16 (FIG. 1). The color adjustments may be generated through the use of computer readable instructions in an image processing tool such as Photoshop®, or a color management utility, for example, provided by a manufacturer of the output imaging device 16.

The adjusted tracer pixels 46 are extracted from the retained spatial locations 44 in the adjusted combined image 66. The second CLUT 30 is converted to a third CLUT 80 having a size N1×N2×N3×N4 by replacing each of the output-device color coordinates 34 of the second CLUT nodes 32 by modified device color coordinates 74 computed from the adjusted color coordinates 36 of the adjusted tracer pixels 46.

Figure 3:
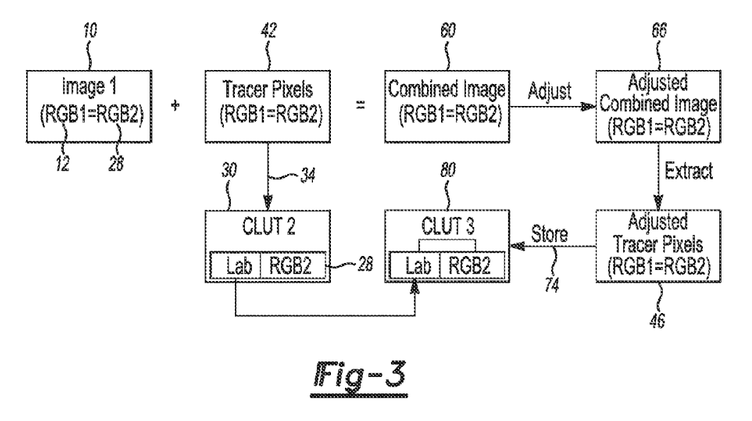
FIG. 3 is a block diagram depicting another example of a process to modify a CLUT executed by a computer system as disclosed herein.

FIG. 3 depicts a variation of the process depicted in FIG. 2 for a first special condition in which the first image color space 12 is the same as the output-device color space 28. FIG. 3 depicts the first special condition where "RGB1=RGB2" is shown in the block for the first image 10. The process is similar to the process shown in FIG. 2 with the following additions: the output-device color coordinates 34 of the second CLUT nodes 32 are selected for the tracer pixels 42; and the modified device color coordinates 74 are stored in corresponding nodes of the third CLUT 80 without modification of the adjusted color coordinates 36 of the adjusted tracer pixels 46.

Figure 4:
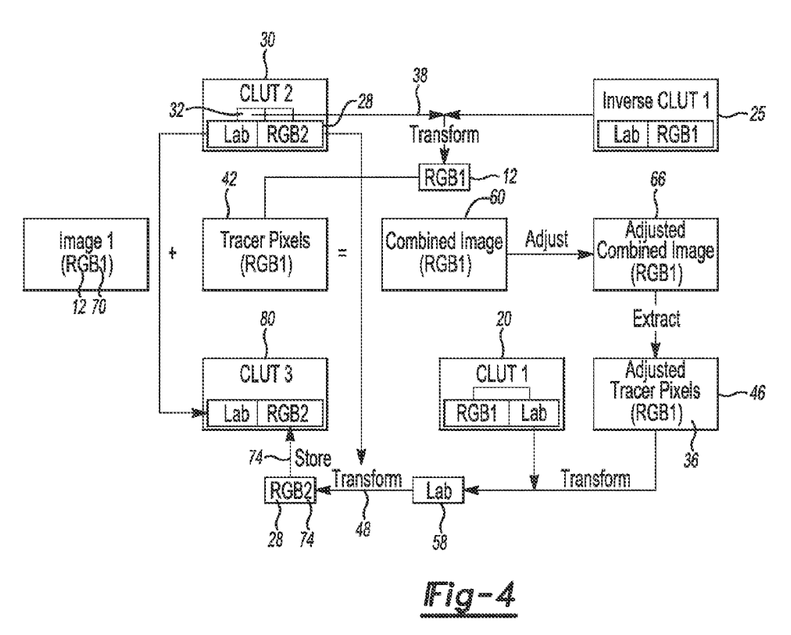
FIG. 4 is a block diagram depicting a further example of a process to modify a CLUT executed by a computer system as disclosed herein.

FIG. 4 depicts an addition to the process depicted in FIG. 2 for a general condition in which the first image color space 12 is a device color space 70 different from the output-device color space 28 of the second CLUT 30. FIG. 4 depicts the general condition where RGB1 and RGB2 are NOT shown having any relationship (i.e. the relationship "RGB1=RGB2" shown in FIG. 3). The process is similar to the process shown in FIG. 2 with the following additions. The colorimetric color coordinates 38 of the second CLUT nodes 32 are selected for the tracer pixels 42. The selected colorimetric color coordinates 38 are transformed to the first image color space 12 via an inverse of the first CLUT 25. The adjusted color coordinates 36 of the adjusted tracer pixels 46 are transformed using the first CLUT 20 to interim tracer pixels 48 in an interim colorimetric space 58. The interim tracer pixels 48 are transformed using the second CLUT 30 to the modified device color coordinates 74 in the output-device color space 28. The modified device color coordinates 74 are stored in corresponding nodes of the third CLUT 80.

Figure 5:
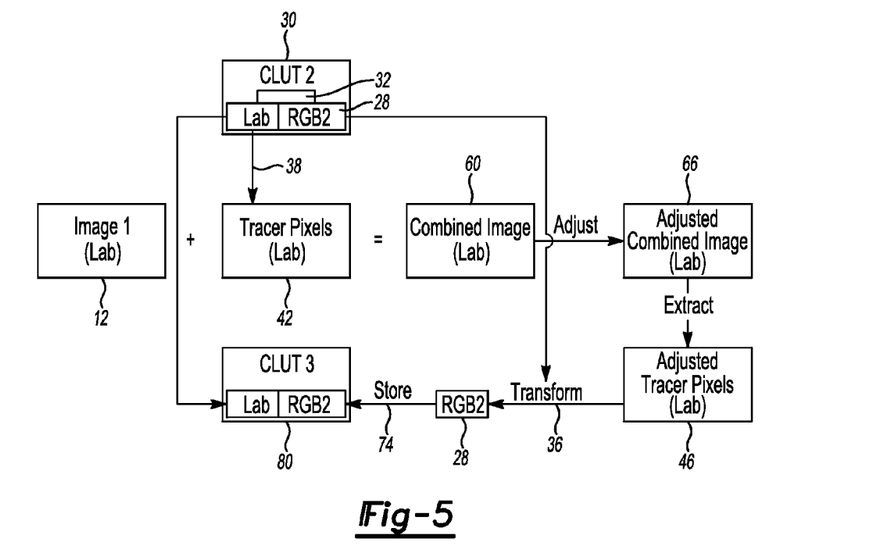
FIG. 5 is a block diagram depicting yet another example of a process to modify a CLUT executed by a computer system as disclosed herein.

FIG. 5 depicts an addition to the process depicted in FIG. 2 for a second special condition in which the first image color space 12 is the colorimetric space 40 or another colorimetric space 26. FIG. 5 depicts the second special condition where (Lab) is shown in the block for the first image 10. The process is similar to the process shown in FIG. 2 with the following additions. The colorimetric color coordinates 38 of the second CLUT nodes 32 are selected for the tracer pixels 42. The adjusted color coordinates 36 of the adjusted tracer pixels 46 are transformed using the second CLUT 30 to the modified device color coordinates 74 in the output-device color space 28. The modified device color coordinates 74 are stored in corresponding nodes of the third CLUT 80.

Figure 6:
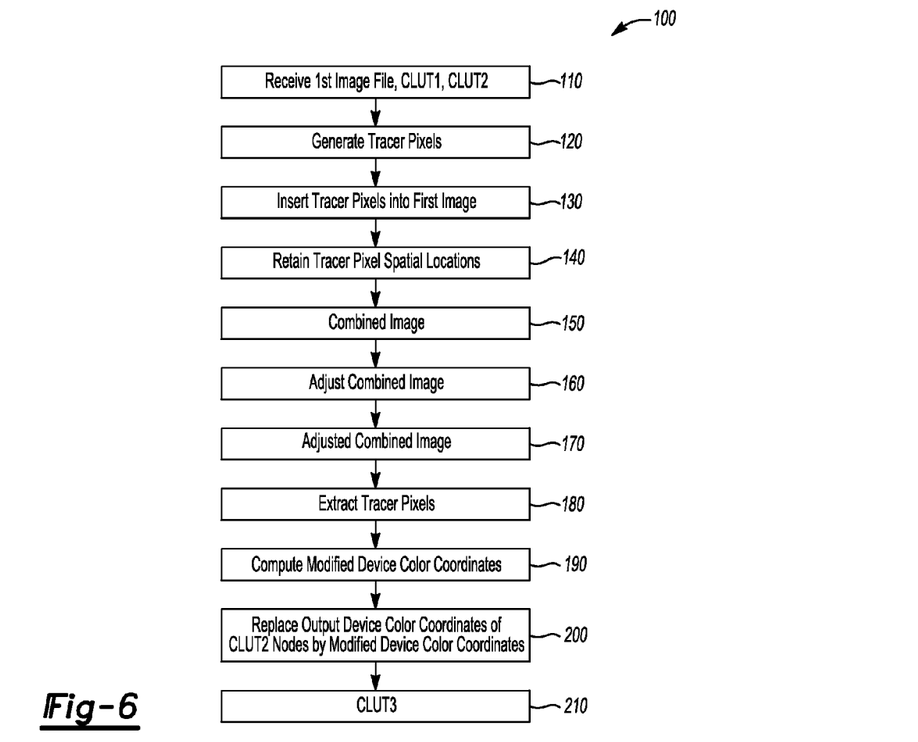
FIG. 6 is a flow diagram depicting an example of a method to modify a CLUT as disclosed herein.
Figure 7:
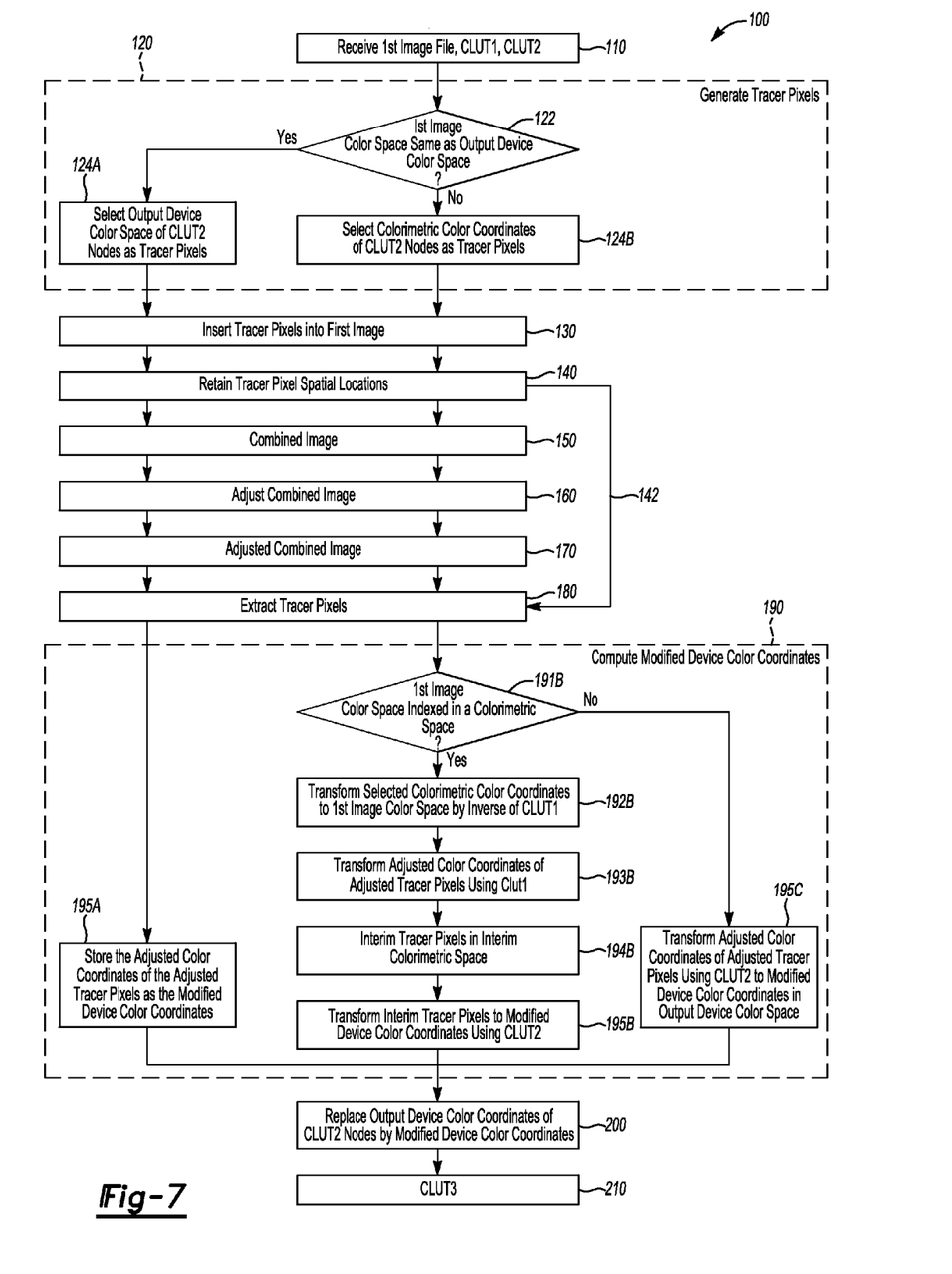
FIG. 7 is a flow diagram depicting an example of a more detailed method to modify a CLUT as disclosed herein.

FIGS. 6 and 7 are process flow diagrams of methods of modifying a CLUT in accordance with examples of the present disclosure. Compared to the process shown in FIG. 6, the process depicted in FIG. 7 includes further steps with further examples regarding generating tracer pixels and computing modified device color coordinates. The reference numerals agree between FIGS. 6 and 7, and for the sake of brevity, the description of FIGS. 6 and 7 is combined herein. The method is designated generally at reference number 100 and may be executed by computing device 18 (FIG. 1). The method may begin at block 110, wherein a first image file, a first CLUT, and a second CLUT 30 may be received.

Block 120 depicts generating tracer pixels. At step 122, the first image color space 12 and the output-device color space 28 are compared. If the first image color space 12 and the output-device color space 28 are the same, Block 124A is executed to select the output-device color space 28 of the second CLUT nodes 32 as tracer pixels 42. Otherwise, Block 124B is executed to select colorimetric color coordinates 38 of the second CLUT nodes 32 as tracer pixels 42.

At block 130, the tracer pixels 42 are inserted into the first image 10 to form a combined image shown at block 150. Spatial locations 44 of the tracer pixels 42 are tracked and retained in the first memory device 50 at block 140. Connecting arrow 142 depicts the use of the retained spatial locations for extracting the tracer pixels at block 180.

Still referring to FIG. 6, at block 160, color adjustments are made to the combined image using image editing computer readable instructions to generate an adjusted combined image (at block 170) having adjusted tracer pixels 46 including adjusted color coordinates 36 in an adjusted combined image file.

At block 180, the adjusted tracer pixels 46 are extracted from the adjusted combined image. At block 190, the instructions are executed to compute modified device color coordinates 74. The detailed steps to compute the modified device color coordinates 74 depend on results of blocks 122 and 191B. If the first image color space 12 and the output-device color space 28 were the same when compared at block 122, then modified device color coordinates 74 are computed at block 195A by storing the adjusted color coordinates 36 of the adjusted tracer pixels 46 as the modified device color coordinates 74. Alternatively, if the first image color space 12 and the output-device color space 28 were NOT the same when compared at block 122, then the block 190 computing modified device color coordinates 74 begins with determining if the first image color space is indexed in a colorimetric space at block 191B. If the first image color space 12 is indexed in a colorimetric space, then the instructions at block 192B are executed to transform the selected colorimetric color coordinates to the first image color space 12 via an inverse of the first CLUT 20. (Recall that colorimetric color coordinates of the second CLUT nodes 32 were selected as the tracer pixels 42 at block 124B.)

At block 193B, the adjusted color coordinates 36 of the adjusted tracer pixels 46 are transformed using the first CLUT 20 to yield interim tracer pixels in an interim colorimetric space at block 194B. Block 195B depicts transforming the interim tracer pixels to modified device coordinates 74 using the second CLUT 30. The third path for computing modified device color coordinates 74 is taken when the first image color space 12 was NOT the same at the output-device color space 28 at block 122 and the first image color space 12 was NOT indexed in a colorimetric space (tested at block 191B). The third path executes the instructions at block 195C to transform the adjusted color coordinates 36 of the adjusted tracer pixels 46 using CLUT2 to modified device color coordinates 74 in the output-device color space 28.

After the modified device color coordinates 74 are computed in block 190, the instructions at block 200 are executed to replace the output device color coordinates 34 of the second CLUT nodes 32 by the modified device color coordinates 74 to form a third CLUT 80 depicted at block 210.

As such, the third CLUT 80 may be applied to any image and produce the same color transformations that were made by the computer user to adjust the image according to the user's preferences.

It is to be understood that in the figures, RGB1 and RGB2 are each used to depict a respective example of a device color space. The device color space could be an RGB color space, a CMYK color space, or any other color space specific to the device.

Figure 8:
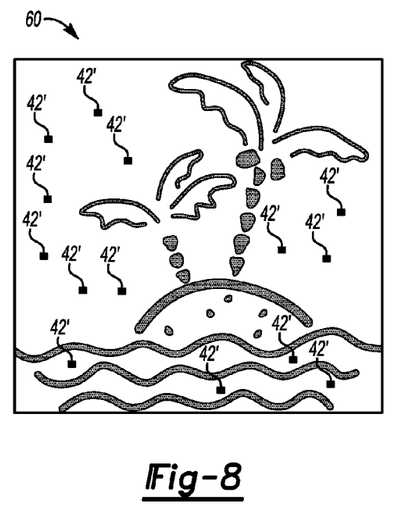
FIG. 8 depicts an example of tracer pixels inserted in an image as disclosed herein.

FIG. 8 depicts an example of tracer pixels 42 inserted in an image as disclosed herein. In examples of the disclosed method, a predetermined quantity of spatially randomly distributed tracer pixels 42 may be inserted into the first image 10. It is to be understood that although the tracer pixels 42 may be randomly distributed, the spatial locations corresponding to each tracer pixel 42' is retained in the first memory device 50. It is to be further understood that, for the sake of clarity in the illustrations, each tracer pixel 42' may be shown in the figures much larger than actual size. As such, small tracer pixels 42 may be steganographically distributed in the image without appreciably changing the appearance of the image.

An image color difference model may be used to judge whether a perceivable difference has been introduced by adding the tracer pixels 42. A standard image color difference method is "CIE 199:2011 Methods for Evaluating Colour Differences in Images". In summary, CIE 199.2011 includes spatially filtering an original and a changed image followed by computing per-pixel color differences. Perceptibility of the added tracer pixels 42 depends on the 95$^{th}$ percentile of the difference distribution being below a certain threshold.

Figure 9:
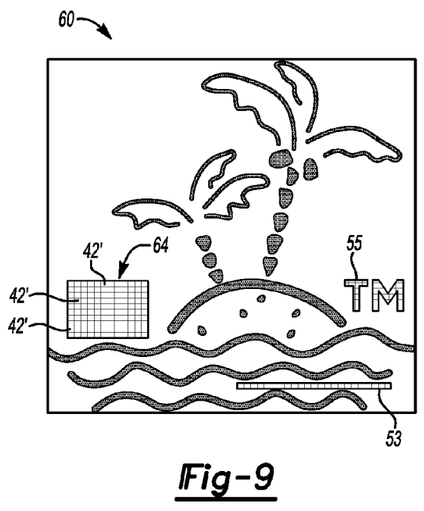
FIG. 9 depicts a further example of tracer pixels inserted in an image as disclosed herein.
Figure 10:
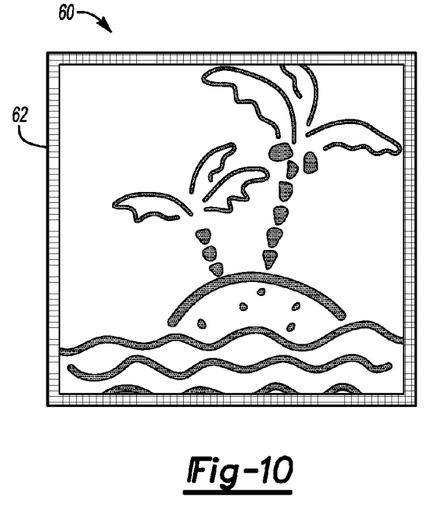
FIG. 10 depicts yet another example of tracer pixels inserted in an image as disclosed herein.

FIG. 9 depicts another example in which a predetermined quantity of tracer pixels 42 may be disposed in a spatial pattern 54. For instance, tracer pixels 42 may be disposed in a row 53, or in a spatial pattern 54 to form a trademark 55. As shown in FIG. 10, the tracer pixels 42 may further be disposed in a spatial pattern 54 that defines a perimeter 62 of the combined image 60 or a rectangle 64 substantially filled with tracer pixels 42 in the combined image 60.

Figure 11:
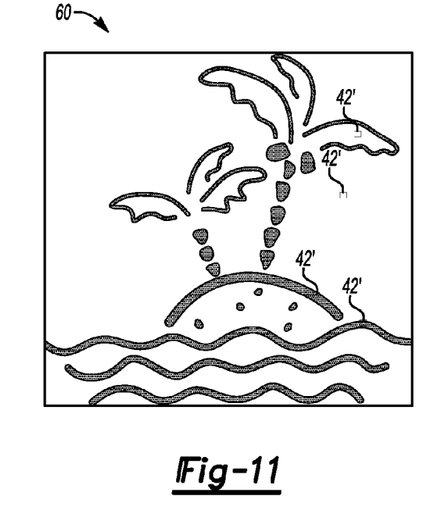
FIG. 11 depicts still another example of tracer pixels inserted in an image as disclosed herein.

FIG. 11 depicts yet another example of tracer pixels 42 inserted in an image as disclosed herein. In some examples of the disclosed method, the tracer pixels 42 may be inserted in locations in the first image 10 that are already substantially the same color as the tracer pixel 42. The method would identify a naturally correspondent image pixel 52 in the first image 10 and a respective tracer pixel 56. A "naturally correspondent image pixel" 52 as used herein means a pixel in the first image 10 spaced within a predetermined Euclidean distance in the colorimetric space from the respective tracer pixel 56. The naturally correspondent image pixel 52 has a natural spatial location in the first image 10. Examples of the disclosed method may substitute a natural spatial location of the naturally correspondent image pixel 52 into the spatial location 54 of the respective tracer pixel 56.

In an example of the present disclosure, a non-transitory, tangible computer-readable medium may have instructions embedded therein. The instructions are executable by a digital processor, and the instructions may be to execute the processes depicted in FIGS. 2-5. It is to be understood that the instructions to insert the tracer pixels into the first image file may include instructions to insert a predetermined quantity of the tracer pixels as disclosed above in the description of FIGS. 8-11.

It is further to be understood that, as used herein, the singular forms of the articles "a," "an," and "the" include plural references unless the content clearly indicates otherwise.

While several examples have been described in detail, it will be apparent to those skilled in the art that the disclosed examples may be modified. Therefore, the foregoing description is to be considered non-limiting.

What is claimed is:

1. A method to modify a color lookup table, comprising:
receiving a first image file having a first image defined in a first image color space, a first color lookup table (CLUT) indexed in the first image color space, and a second CLUT indexed in a device independent colorimetric space, the second CLUT having second CLUT nodes, device independent colorimetric color coordinates, and output-device color coordinates in an output-device color space for an output imaging device at the second CLUT nodes;
generating and retaining in a first memory device tracer pixels from the second CLUT wherein each tracer pixel includes color coordinates of a corresponding unique node in the first CLUT;
inserting the tracer pixels into the first image to form a combined image in a combined image file;
tracking and retaining in the first memory device spatial locations of the tracer pixels in the combined image;
making color adjustments to the combined image using image editing computer readable instructions to generate an adjusted combined image having adjusted tracer pixels including adjusted color coordinates in an adjusted combined image file;
extracting the adjusted tracer pixels from the retained spatial locations in the adjusted combined image; and
converting the second CLUT to a third CLUT having a size $N_1 \times N_2 \times N_3 \times N_4$ by replacing each of the output-device color coordinates of the second CLUT nodes by modified device color coordinates computed from the adjusted color coordinates of the adjusted tracer pixels;
wherein:
the tracer pixels are pixels generated from the second CLUT and retained in the first memory device;
the tracer pixels each include color coordinates of the corresponding unique node in the first CLUT;
the tracer pixels are inserted into the first image to form the combined image in the combined image file; and
the tracer pixels have their spatial locations in the combined image separably tracked and retained in the first memory device.

2. The method as defined in claim 1 wherein the first image color space is the same as the output-device color space of the second CLUT, and the method further comprises:
selecting the output-device color coordinates of the second CLUT nodes for the tracer pixels; and
storing the modified device color coordinates in corresponding nodes of the third CLUT without modification of the adjusted color coordinates of the adjusted tracer pixels.

3. The method as defined in claim 1 wherein the first image color space is a device color space different from the output-device color space of the second CLUT, and the method further comprises:
selecting the device independent colorimetric color coordinates of the second CLUT nodes for the tracer pixels;

transforming the selected device independent colorimetric color coordinates to the first image color space via an inverse of the first CLUT;
transforming the adjusted color coordinates of the adjusted tracer pixels using the first CLUT to interim tracer pixels in an interim device independent colorimetric space;
transforming the interim tracer pixels using the second CLUT to the modified device color coordinates in the output-device color space; and
storing the modified device color coordinates in corresponding nodes of the third CLUT.

4. The method as defined in claim 1 wherein the first image color space is the device independent colorimetric space or an other device independent colorimetric space, and the method further comprises:
selecting the device independent colorimetric color coordinates of the second CLUT nodes for the tracer pixels;
transforming the adjusted color coordinates of the adjusted tracer pixels using the second CLUT to the modified device color coordinates in the output-device color space; and
storing the modified device color coordinates in corresponding nodes of the third CLUT.

5. The method as defined in claim 1 wherein inserting the tracer pixels into the first image file further includes:
inserting a predetermined quantity of the tracer pixels, wherein the tracer pixels are spatially randomly distributed or the tracer pixels are disposed in a spatial pattern.

6. The method as defined in claim 5 wherein the spatial pattern defines a perimeter of the combined image, or the spatial pattern defines a rectangle substantially filled with the tracer pixels in the combined image.

7. The method as defined in claim 1, further comprising:
identifying a naturally correspondent image pixel in the first image and a respective tracer pixel; and
substituting a natural spatial location of the naturally correspondent image pixel into the spatial location of the respective tracer pixel wherein the naturally correspondent image pixel is a pixel in the first image spaced within a predetermined Euclidean distance in the device independent colorimetric space from the respective tracer pixel.

8. A computer system, comprising:
a digital processor; and
computer readable instructions embedded on a non-transitory, tangible memory device, the instructions being executable by the digital processor, the instructions to:
receive a first image file having a first image defined in a first image color space and a first color lookup table (CLUT) indexed in the first image color space, and a second CLUT indexed in a device independent colorimetric space, the second CLUT having second CLUT nodes, device independent colorimetric color coordinates, and output-device color coordinates for an output imaging device at the second CLUT nodes;
generate and retain in an other memory device tracer pixels from the second CLUT wherein each tracer pixel includes color coordinates of a corresponding unique node in the first CLUT;
insert the tracer pixels into the first image to form a combined image in a combined image file;
track and retain in the other memory device spatial locations of the tracer pixels in the combined image;
receive an adjusted combined image having adjusted tracer pixels including adjusted color coordinates in an adjusted combined image file having color adjustments to the combined image;
extract the adjusted tracer pixels from the retained spatial locations in the adjusted combined image; and
convert the second CLUT to a third CLUT having a size $N_1 \times N_2 \times N_3 \times N_4$ by replacing each of the output-device color coordinates of the second CLUT nodes by modified device color coordinates computed from the adjusted color coordinates of the adjusted tracer pixels;
wherein:
the tracer pixels are pixels generated from the second CLUT and retained in the other memory device;
the tracer pixels each include color coordinates of the corresponding unique node in the first CLUT;
the tracer pixels are inserted into the first image to form the combined image in the combined image file; and
the tracer pixels have their spatial locations in the combined image separably tracked and retained in the other memory device.

9. The computer system as defined in claim 8 wherein the first image color space is the same as the output-device color space, and the computer readable instructions further:
select the output-device color coordinates of the second CLUT nodes for the tracer pixels; and
store the modified device color coordinates in corresponding nodes of the third CLUT without modification of the adjusted color coordinates of the adjusted tracer pixels.

10. The computer system as defined in claim 8 wherein the first image color space is a device color space different from the output device color space of the second CLUT, and the computer readable instructions further:
select the device independent colorimetric color coordinates of the second CLUT nodes for the tracer pixels;
transform the selected device independent colorimetric color coordinates to the first image color space via an inverse of the first CLUT;
transform the adjusted color coordinates of the adjusted tracer pixels using the first CLUT to interim tracer pixels in an interim device independent colorimetric space;
transform the interim tracer pixels using the second CLUT to the modified device color coordinates in the output-device color space; and
store the modified device color coordinates in corresponding nodes of the third CLUT.

11. The computer system as defined in claim 8 wherein the first image color space is the device independent colorimetric space or an other device independent colorimetric space, and the computer readable instructions further:
select the device independent colorimetric color coordinates of the second CLUT nodes for the tracer pixels;
transform the adjusted color coordinates of the adjusted tracer pixels using the second CLUT to the modified device color coordinates in the output-device color space; and
store the modified device color coordinates in corresponding nodes of the third CLUT.

12. The computer system as defined in claim 8 wherein the instructions to insert the tracer pixels into the first image file include instructions to insert a predetermined quantity of the tracer pixels, wherein the tracer pixels are spatially randomly distributed or the tracer pixels are disposed in a spatial pattern.

13. The computer system as defined in claim 12 wherein the spatial pattern defines a perimeter of the combined image, or the spatial pattern defines a rectangle substantially filled with the tracer pixels in the combined image.

14. The computer system as defined in claim 8 wherein the instructions further:

identify a naturally correspondent image pixel in the first image and a respective tracer pixel; and substitute a natural spatial location of the naturally correspondent image pixel into the spatial location of the respective tracer pixel, wherein the naturally correspondent image pixel is a pixel in the first image spaced within a predetermined Euclidean distance in the device independent colorimetric space from the respective tracer pixel.

15. A non-transitory, tangible computer-readable medium having embedded therein instructions executable by a digital processor, the instructions to:

receive a first image file having a first image defined in a first image color space and a first color lookup table (CLUT) indexed in the first image color space, and a second CLUT indexed in a device independent colorimetric space, the second CLUT having second CLUT nodes, device independent colorimetric color coordinates, and output-device color coordinates for an output imaging device at the second CLUT nodes;

generate and retain in a first memory device tracer pixels from the second CLUT wherein each tracer pixel includes color coordinates of a corresponding unique node in the first CLUT;

insert the tracer pixels into the first image to form a combined image in a combined image file;

track and retain in the first memory device spatial locations of the tracer pixels in the combined image;

receive an adjusted combined image having adjusted tracer pixels including adjusted color coordinates in an adjusted combined image file having color adjustments to the combined image;

extract the adjusted tracer pixels from the retained spatial locations in the adjusted combined image; and convert the second CLUT to a third CLUT having a size $N_1 \times N_2 \times N_3 \times N_4$ by replacing each of the output-device color coordinates of the second CLUT nodes by modified device color coordinates computed from the adjusted color coordinates of the adjusted tracer pixels;

wherein:

the tracer pixels are pixels generated from the second CLUT and retained in the first memory device;

the tracer pixels each include color coordinates of the corresponding unique node in the first CLUT;

the tracer pixels are inserted into the first image to form the combined image in the combined image file; and the tracer pixels have their spatial locations in the combined image separably tracked and retained in the first memory device.

16. The computer-readable medium as defined in claim 15 wherein the first image color space is the same as the output-device color space, and the instructions further:

select the output-device color coordinates of the second CLUT nodes for the tracer pixels; and store the modified device color coordinates in corresponding nodes of the third CLUT without modification of the adjusted color coordinates of the adjusted tracer pixels.

17. The computer-readable medium as defined in claim 15 wherein the first image color space is a device color space different from the output-device color space of the second CLUT, and the instructions further:

select the device independent colorimetric color coordinates of the second CLUT nodes for the tracer pixels;

transform the selected device independent colorimetric color coordinates to the first image color space via an inverse of the first CLUT;

transform the adjusted color coordinates of the adjusted tracer pixels using the first CLUT to interim tracer pixels in an interim device independent colorimetric space;

transform the interim tracer pixels using the second CLUT to the modified device color coordinates in the output-device color space; and store the modified device color coordinated in corresponding nodes of the third CLUT.

18. The computer-readable medium as defined in claim 15 wherein the first image color space is the device independent colorimetric space or an other device independent colorimetric space, and the instructions further:

select the device independent colorimetric color coordinates of the second CLUT nodes for the tracer pixels;

transform the adjusted color coordinates of the adjusted tracer pixels using the second CLUT to the modified device color coordinates in the output-device color space; and store the modified device color coordinates in corresponding nodes of the third CLUT.

19. The computer-readable medium as defined in claim 15 wherein:

the instructions to insert the tracer pixels into the first image file include instructions to insert a predetermined quantity of the tracer pixels;

the tracer pixels are spatially randomly distributed or the tracer pixels are disposed in a spatial pattern; and the spatial pattern defines a perimeter of the combined image or the spatial pattern defines a rectangle substantially filled with the tracer pixels in the combined image.

20. The computer-readable medium as defined in claim 15 wherein the instructions further:

identify a naturally correspondent image pixel in the first image and a respective tracer pixel; and substitute a natural spatial location of the naturally correspondent image pixel into the spatial location of the respective tracer pixel wherein the naturally correspondent image pixel is a pixel in the first image spaced within a predetermined Euclidean distance in the device independent colorimetric space from the respective tracer pixel.

21. A method to modify a color lookup table, comprising:

receiving a first image file having a first image defined in a first image color space, a first color lookup table (CLUT) indexed in the first image color space, and a second CLUT indexed in a device independent colorimetric space, the second CLUT having second CLUT nodes, device independent colorimetric color coordinates, and output-device color coordinates in an output-device color space for an output imaging device at the second CLUT nodes;

generating and retaining in a first memory device tracer pixels from the second CLUT wherein each tracer pixel includes color coordinates of a corresponding unique node in the first CLUT;

inserting the tracer pixels into the first image to form a combined image in a combined image file;

tracking and retaining in the first memory device spatial locations of the tracer pixels in the combined image;

making color adjustments to the combined image using image editing computer readable instructions to generate an adjusted combined image having adjusted tracer pixels including adjusted color coordinates in an adjusted combined image file;

extracting the adjusted tracer pixels from the retained spatial locations in the adjusted combined image;

converting the second CLUT to a third CLUT having a size $N_1 \times N_2 \times N_3 \times N_4$ by replacing each of the output-device color coordinates of the second CLUT nodes by modified device color coordinates computed from the adjusted color coordinates of the adjusted tracer pixels;

wherein:
- the tracer pixels are pixels generated from the second CLUT and retained in the first memory device;
- the tracer pixels each include color coordinates of the corresponding unique node in the first CLUT;
- the tracer pixels are inserted into the first image to form the combined image in the combined image file; and
- the tracer pixels have their spatial locations in the combined image separably tracked and retained in the first memory device;

wherein the first image color space is a device color space different from the output-device color space of the second CLUT, and the method further comprises:

selecting the device independent colorimetric color coordinates of the second CLUT nodes for the tracer pixels;

transforming the selected device independent colorimetric color coordinates to the first image color space via an inverse of the first CLUT;

transforming the adjusted color coordinates of the adjusted tracer pixels using the first CLUT to interim tracer pixels in an interim device independent colorimetric space;

transforming the interim tracer pixels using the second CLUT to the modified device color coordinates in the output-device color space;

storing the modified device color coordinates in corresponding nodes of the third CLUT;

identifying a naturally correspondent image pixel in the first image and a respective tracer pixel; and substituting a natural spatial location of the naturally correspondent image pixel into the spatial location of the respective tracer pixel wherein the naturally correspondent image pixel is a pixel in the first image spaced within a predetermined Euclidean distance in the device independent colorimetric space from the respective tracer pixel.

* * * * *